(12) United States Patent
Sivaswamy et al.

(10) Patent No.: US 7,817,708 B2
(45) Date of Patent: Oct. 19, 2010

(54) ORTHOGONAL CODE DIVISION MULTIPLEX CCK (OCDM-CCK) METHOD AND APPARATUS FOR HIGH DATA RATE WIRELESS LAN

(75) Inventors: Ram Sivaswamy, Ashburn, VA (US); Pradeep Siva Swamy, Orlando, FL (US)

(73) Assignee: Sivaswamy Associates, LLC., Ashburn, VA (US)

( * ) Notice: Subject to any disclaimer, the term of this patent is extended or adjusted under 35 U.S.C. 154(b) by 404 days.

(21) Appl. No.: 12/036,724

(22) Filed: Feb. 25, 2008

(65) Prior Publication Data

US 2009/0154333 A1    Jun. 18, 2009

Related U.S. Application Data

(60) Provisional application No. 61/013,689, filed on Dec. 14, 2007.

(51) Int. Cl.
*H04B 1/00*    (2006.01)
(52) U.S. Cl. .................. 375/141; 375/260; 375/295; 375/316
(58) Field of Classification Search .................. 375/141, 375/260, 295, 316
See application file for complete search history.

(56) References Cited

U.S. PATENT DOCUMENTS

| | | | |
|---|---|---|---|
| 5,243,341 A | 9/1993 | Seroussi et al. | |
| 5,636,247 A | 6/1997 | Kamerman et al. | |
| 5,694,389 A | 12/1997 | Seki et al. | |
| 5,771,010 A | 6/1998 | Masenas | |
| 5,841,813 A | 11/1998 | van Nee | |
| 5,841,819 A | 11/1998 | Hu et al. | |
| 5,982,807 A | 11/1999 | Snell | |
| 6,005,840 A | 12/1999 | Awater et al. | |
| 6,301,221 B1 | 10/2001 | Paterson | |
| 6,314,289 B1 | 11/2001 | Eberlein et al. | |
| 6,674,819 B2 | 1/2004 | Rudolf et al. | |
| 6,678,310 B1 | 1/2004 | Andren et al. | |
| 6,711,121 B1 | 3/2004 | Gerakoulis et al. | |
| 6,882,679 B2 | 4/2005 | Somayazulu et al. | |

(Continued)

OTHER PUBLICATIONS

R. Sivaswamy, "Multiphase Complementary Codes," IEEE Transactions on Information Theory, vol. IT-24, No. 5, Sep. 1978.

(Continued)

*Primary Examiner*—Ted M Wang
(74) *Attorney, Agent, or Firm*—Carlos R. Villamar; The Villamar Firm PLLC

(57) ABSTRACT

Orthogonal Code Division Multiplexing (OCDM) transceiver system with Complementary Code Keying (CCK) and method for baseband OCDM-CCK encoding and decoding are provided. The OCDM-CCK method comprises a serial-to-parallel data converter converting a stream of M*n-bit serial data to n-bit parallel data in 'M' parallel baseband paths, and encoding each n-bit data segment with a distinct complementary code using CCK modulation for spreading. The CCK encoded baseband signals are all summed and transmitted simultaneously on the same carrier frequency and spread spectral bandwidth. The OCDM-CCK method of encoding and transmission of information, results in enhanced datarates of 33 Mbps, 88 Mbps, 176 Mbps and higher multiples of 5.5 Mbps with backward compatibility for IEEE 802.11b WLAN (Wireless Local Area Network), and wireless communication networks supporting real time Direct Sequence Spread Spectrum (DSSS).

16 Claims, 20 Drawing Sheets

U.S. PATENT DOCUMENTS

| | | | |
|---|---|---|---|
| 6,882,692 | B2 | 4/2005 | Somayazulu |
| 6,956,910 | B2 | 10/2005 | Lu et al. |
| 7,027,538 | B2 | 4/2006 | Ghosh |
| 7,079,567 | B2 | 7/2006 | van Nee |
| 7,145,969 | B1 | 12/2006 | Hu et al. |
| 7,151,925 | B2 | 12/2006 | Ting et al. |
| 7,187,730 | B1 | 3/2007 | Hu et al. |
| 7,200,164 | B2 | 4/2007 | Chen et al. |
| 7,243,318 | B1 | 7/2007 | Mirza et al. |
| 7,253,754 | B2 | 8/2007 | Takeuchi et al. |
| 7,318,225 | B1 | 1/2008 | Sorar |
| 7,593,347 | B2 * | 9/2009 | Maltsev et al. ............ 370/252 |
| 7,738,538 | B1 * | 6/2010 | Tung .......................... 375/150 |
| 2002/0009125 | A1 * | 1/2002 | Shi ............................. 375/139 |
| 2003/0054788 | A1 | 3/2003 | Sugar et al. |
| 2003/0147478 | A1 | 8/2003 | Chang et al. |
| 2004/0086028 | A1 | 5/2004 | Kluge et al. |

OTHER PUBLICATIONS

R. Sivaswamy, "Digital and analog sub complementary sequences", (IEEE. Transactions on Aerospace Electronic Systems, vol. 14, No. 2, Mar. 1978.

Carl Andren, Mark Webster, "CCK Modulation Delivers 11Mbps for High Rate IEEE 802.11 Extension," Wireless Symposium/Portable by Design Conference Spring 1999.

R. van Nee, "OFDM codes for peak-to-average power reduction and error correction," Proc. IEEE Global Telecommunication. Conference, vol. 1, pp. 740-744, Nov. 1996.

B. O'Hara and A. Petrick, IEEE 802.11 Handbook: Designer's Companion, IEEE Press, Dec. 1999.

IEEE Std., 802.11b, Part 11: Wireless LAN medium access control (MAC) and physical layer (PHY) specifications: High-speed physical layer extension in the 2.4 GHz band, 1999.

Mario E. Magana et. al., "Improvement of Data Rate Performance of Wireless Local Area Networks through the Use of Orthogonal Code Division Multiplexing (OCDM), Multipath Diversity, and Parallel Concatenated Channel Encoding", Wireless Personal Communications, Kluwer Academic Publishers. vol. 25, No. 4, Jul. 2003, pp. 293-305.

Harada, H., "OCDM: a new multicode CDM radio transmission system based on cyclicmodified M-sequences-performance evaluation using prototype", Vehicular Technology Conference, 1999 IEEE 49th vol. 3, Issue, Jul. 1999 pp. 1819-1825 vol. 3.

Abstract of B. Sklar, "A Primer on Turbo Code Concepts", IEEE Commun. Mag., vol. 36, No. 12, pp. 94-102, 1997.

Abstract of B.P. Crow et al., "IEEE 802.11 Wireless Local Area Networks", IEEE Commun. Mag., vol. 35, No. 9, pp. 116-126, 1997.

Abstract of R. van Nee, G. Awater, M. Morikura, H. Takanashi, M. Webster and K.W. Halford, "New High-Rate Wireless LAN Standards", IEEE Communications Magazine, pp. 82-88, 1999.

Abstract of J.G. Proakis, Digital Communications, McGraw-Hill: New York, 2001.

E. Lawrey, "Multiuser OFDM", Fifth International Symposium on Signal Processing and its Applications, ISSPA '99, Brisbane, Australia, Aug. 22-25, 1999, Organized by the Signal Processing Research Center, QUT, Brisbane, Australia, pp. 761-764.

M. Wahlqvist, et. al, "A Conceptual Study of OFDM-based Multiple Access Schemes", Technical Report Tdoc 117/96, ETSI STC, SMG2 meeting No. 18, Helsinki, Finland, May 1996.

Bob Pearson, "Complementary Code Keying Made Simple," Intersil, Application Note Nov. 2001 AN9850.2.

Marcel J. E. Golay, "Complementary Series," IRE Transactions on Information Theory, pp. 82-87, Apr. 1961.

R. L. Frank, "Polyphase Complementary Codes", IEEE Transactions on Information Theory, Nov. 1980, vol. IT-26, No. 6, pp. 641-647.

R. Craigen, e. al., "Complex Golay sequences: structure and applications", Discrete Mathematics, vol. 252, No. 1, May 31, 2002, pp. 73-89(17).Publisher: Elsevier.

W.H. Holzmann and H. Kharaghani: "A computer search for complex Golay sequences," Australasian Journal of Combinatorics, No. 10, pp. 251-258, 1994.

IEEE Draft Supplement to Standard for Information Technology—Telecommunications and Information Exchange Between Systems- Specific Requirements- Part 11: Wireless LAN Medium Access Control (MAC) and Physical Layer (PHY) specifications: Higher Speed Physical Layer (PHY) Extension in the 2.4 GHz Band, 1999, IEEE P802.11b/D4.0, IEEE, USA.

Webster, Mark and Andren, Carl; Harris/Lucent CCK Description: Additional Covercode and Fast Transform Detail; Sep. 1998; doc,: IEEE 802. 11-98/331; Harris Semiconductor, Melbourne, FL.

Harris Semiconductor Note entitled, "PRISM 2.4 GHz Chip Set," File No. 4063.4, Oct. 1996.

Intersil Tech Brief entitled, "A Brief Tutorial on Spread Spectrum and Packet Radio", No. TB337.1, May 1996, by Carl Andren.

Harris Corporation, "Direct Sequence Spread Spectrum Baseband Processor," File No. 4064.4, Oct. 1996.

Intersil Data Sheet entitled "Direct Sequence Baseband Processor", File No. 4594.1, Jul. 1999.

Abstract of T. Shono, et. al.,: Performance of IEEE 802.11 Wireless LAN Implemented on Software Defined Radio with Hybrid Programmable Architecture. Proceedings. of IEEE International Conference on Communications, 2003, vol. 3, 2003, p. 2035-2040.

Seiichi Nishijima, Miyoshi Saito and Iwao Sugiyama, "Single-Chip Baseband Signal Processor for Software-Defined Radio", Fujitsu Sci. Tech. J., 42,2,p. 240-247(Apr. 2006).

S. D. Deshpande et. al., "Software Implementation of IEEE 802.11b Wireless LAN Standard", Software Defined Radio Technical Conference and Product Exposition, Nov. 15-18, 2004—Phoenix, Arizona.

Intersil Data Sheet entitled "Direct Sequence Spread Spectrum Baseband Processor", File No. 4776.3. Nov. 2001.

* cited by examiner

Generator Algorithm (41) for Codelist 'A' (33)

$[C_1 = \exp(j(\theta_1 + K_1 + \theta_2 + \theta_3))],$
$[C_2 = \exp(j(\theta_1 + \theta_2 + \theta_3))],$
$[C_3 = \exp(j(\theta_1 + K_1 + \theta_3))],$
$[C_4 = \exp(j(\theta_1 + \theta_3 + \pi))],$
$[C_5 = \exp(j(\theta_1 + K_1 + \theta_2))],$
$[C_6 = \exp(j(\theta_1 + \theta_2))],$
$[C_7 = \exp(j(\theta_1 + K_1 + \pi))],$
$[C_8 = \exp(j(\theta_1))].$

FIG. 4e

Generator Algorithm (42) for Codelist 'B' (34)

$[C_1 = \exp(j(\theta_1 + K_2 + \theta_2 + \theta_3))],$
$[C_2 = \exp(j(\theta_1 + \theta_2 + \theta_3))],$
$[C_3 = \exp(j(\theta_1 + K_2 + \theta_3))],$
$[C_4 = \exp(j(\theta_1 + \theta_3 + \pi))],$
$[C_5 = \exp(j(\theta_1 + K_2 + \theta_2))],$
$[C_6 = \exp(j(\theta_1 + \theta_2))],$
$[C_7 = \exp(j(\theta_1 + K_2 + \pi))],$
$[C_8 = \exp(j(\theta_1))].$

FIG. 4f

Generator Algorithm (43) for Codelist 'C' (35)

$[C_1 = \exp(j(\theta_1 + K_3 + \theta_2 + \theta_3))],$
$[C_2 = \exp(j(\theta_1 + \theta_2 + \theta_3))],$
$[C_3 = \exp(j(\theta_1 + K_3 + \theta_3))],$
$[C_4 = \exp(j(\theta_1 + \theta_3 + \pi))],$
$[C_5 = \exp(j(\theta_1 + K_3 + \theta_2))].$
$[C_6 = \exp(j(\theta_1 + \theta_2))],$
$[C_7 = \exp(j(\theta_1 + K_3 + \pi))],$
$[C_8 = \exp(j(\theta_1))].$

FIG. 4g

Generator Algorithm (44) for Codelist 'D' (36)

$[C_1 = \exp(j(\theta_1 + K_4 + \theta_2 + \theta_3))]$,
$[C_2 = \exp(j(\theta_1 + \theta_2 + \theta_3))]$,
$[C_3 = \exp(j(\theta_1 + K_4 + \theta_3))]$,
$[C_4 = \exp(j(\theta_1 + \theta_3 + \pi))]$,
$[C_5 = \exp(j(\theta_1 + K_4 + \theta_2))]$,
$[C_6 = \exp(j(\theta_1 + \theta_2))]$,
$[C_7 = \exp(j(\theta_1 + K_4 + \pi))]$,
$[C_8 = \exp(j(\theta_1))]$.

FIG. 4h

Codelist Generator algorithm for 88 Mbps and multiples of 5.5 Mbps $[C_1 = \exp(j(\theta_1 + K_p + L_q + \theta_2))].$
$[C_2 = \exp(j(\theta_1 + L_q + \theta_2))].$
$[C_3 = \exp(j(\theta_1 + K_p + L_q))].$
$[C_4 = \exp(j(\theta_1 + \theta_2 + \pi))].$
$[C_5 = \exp(j(\theta_1 + K_p + L_q))].$
$[C_6 = \exp(j(\theta_1 + L_q))].$
$[C_7 = \exp(j(\theta_1 + K_p + \pi))].$
$[C_8 = \exp(j(\theta_1))].$ Where, $K_p$ and $L_q$ are independent phase constants included from the following:
$[0, \pi/2, \pi, 3\pi/2]$

FIG. 6a

| Phase parameter encoding scheme for 11 Mbps | |
|---|---|
| Databit stream sequence | Phase parameter |
| (d2, d1) | $\varphi_1$ |
| (d4, d3) | $\varphi_2$ |
| (d6, d5) | $\varphi_3$ |
| (d8, d7) | $\varphi_4$ |

FIG. 8a

| DQPSK modulation scheme for OCDM-CCK phase parameters | |
|---|---|
| Data Bits | Mapping Phase |
| 00 | 0 |
| 01 | $\pi/2$ |
| 10 | $\pi$ |
| 11 | $3\pi/2$ |

FIG. 8b

| Phase parameter encoding scheme for 33 Mbps | |
|---|---|
| Databit stream sequence | Phase parameter |
| (d2, d1) | $\varphi_1$ |
| (d4, d3) | $\varphi_2$ |
| (d6, d5) | $\varphi_3$ |

FIG. 8c

Generic E-CCK Codelist Generator Algorithm for 33 Mbps $[C_1 = \exp(j(\theta_1 + K + \theta_2 + \theta_3))]$,
$[C_2 = \exp(j(\theta_1 + \theta_2 + \theta_3))]$,
$[C_3 = \exp(j(\theta_1 + K + \theta_3))]$,
$[C_4 = \exp(j(\theta_1 + \theta_3 + \pi))]$,
$[C_5 = \exp(j(\theta_1 + K + \theta_2))]$,
$[C_6 = \exp(j(\theta_1 + \theta_2))]$,
$[C_7 = \exp(j(\theta_1 + K + \pi))]$,
$[C_8 = \exp(j(\theta_1))]$.

where,
$C_1, C_2, C_3, C_4, C_5, C_6, C_7, C_8$, are the individual chips of the complementary code represented by:
$C = [C_1 \quad C_2 \quad C_3 \quad C_4 \quad C_5 \quad C_6 \quad C_7 \quad C_8]^T$

FIG. 9

Comparison of OCDM-CCK with IEEE 802.11b CCK

| Item Number | Parameter | OCDM-CCK (176 Mbps) | OCDM-CCK (88 Mbps) | OCDM-CCK (33 Mbps) | IEEE 802.11b (11 Mbps) |
|---|---|---|---|---|---|
| 1 | Spectral bandwidth | 22 MHz | 22 MHz | 22 MHz | 22 MHz |
| 2 | Chipping rate | 11 MChips/s | 11 MChips/s | 11 MChips/s | 11 MChips/s |
| 3 | Chips per code | 8 | 8 | 8 | 8 |
| 4 | Chip duration (Microseconds) | (1/11) | (1/11) | (1/11) | (1/11) |
| 5 | Codeword duration (Microseconds) | 8/11 (8 chips) | 8/11 (8 chips) | 8/11 (8 chips) | 8/11 (8 chips) |
| 6 | Symbol Rate (Mwords/s) | 1.375 (11/8) | 1.375 (11/8) | 1.375 (11/8) | 1.375 (11/8) |
| 7 | Information bits mapped per codeword | 2-bits | 4-bits | 6-bits | 8-bits |
| 8 | Number of codewords transmitted simultaneously | 64 | 16 | 4 | 1 |
| 9 | Transmitted datarate | 176 Mbits/s (2*64*1.375) | 88 Mbits/s (4*16*1.375) | 33 Mbits/s (6*4*1.375) | 11 Mbits/s (8*1.375) |
| 10 | Number of codewords to be picked from a codelist | 1 out of 1 | 1 out of 4 | 1 out of 16 | 1 out of 64 |
| 11 | Number of orthogonal codelists | 64 | 16 | 4 | 1 |
| 12 | Total number of distinct CCK codewords used | 64 | 64 | 64 | 64 |

FIG. 10

ORTHOGONAL CODE DIVISION MULTIPLEX CCK (OCDM-CCK) METHOD AND APPARATUS FOR HIGH DATA RATE WIRELESS LAN

CROSS REFERENCE TO RELATED DOCUMENTS

The present invention claims benefit of priority to U.S. Provisional Patent Application Ser. No. 61/013,689 of Sivaswamy et al., entitled "ORTHOGONAL CODE DIVISION MULTIPLEX CCK (OCDM-CCK) METHOD AND APPARATUS FOR HIGH DATA RATE WIRELESS LAN," filed on Dec. 14, 2007, the entire disclosure of which is hereby incorporated by reference herein.

BACKGROUND OF THE INVENTION

1. Field of the Invention

The present invention generally relates wireless communications technologies, and more particularly to a method and system for transmitted signal encoding and received signal decoding for WLAN (Wireless Local Area Network) transceivers for enhancing information transmission datarates.

2. Discussion of the Background

The IEEE standard 802.11b Wireless LANs have a technical limitation on datarates that cannot go above 5.5 and 11 Mbps in the 2.4 GHz spectrum for CCK, which is the specified modulation technique called Complementary Code Keying.

The Wireless LANs transmit and receive data over the air, minimizing the need for wired connections. Hence, wireless LANs combine data connectivity with operational mobility. Most WLAN systems use spread spectrum technology, a wide-band radio frequency technique developed for use in reliable and secure communication systems.

The modulation method called OCDM (Orthogonal Code Division Multiplex) uses multiple spreading codes on the same frequency simultaneously, and sends multiple streams of data on OCDM channels compared to OFDM (Orthogonal Frequency Division Multiplex), which send multiple streams of data on orthogonal frequency division multiplexing channels.

Traditionally, encoders and decoders of modulation coding systems use specific modulation methods. Complementary code keying (CCK) is a variation of complementary codes originally discovered only in binary (BPSK) form by M. J. E. Golay, in "Complementary Series," IRE Transactions on Information Theory, vol. IT-7, pp 82-87, April 1961. Later, R. Sivaswamy in "Multiphase Complementary Codes," IEEE Transactions on Information Theory, vol. IT-24, No. 5, September 1978", found the new class of multiphase including polyphase complementary codes for QPSK, which were best suited for CCK modulation, and provided the following generic equation for complementary codes:

$$C=[C_1, C_2, C_3, \ldots C_n]=[\exp \{j(\phi_1)\}], [\exp \{j(\phi_1+\phi_2)\}] \ldots [\exp \{j(\phi_1+\phi_2 \ldots +\phi_n)\}],$$

where, C is a n-chip discrete phase coded sequence of length 'n' represented in complex form, and the $n^{th}$ chip given by $C_n=[\exp \{j(\phi_1+\phi_2+\phi_3 \ldots +\phi_n)\}]$. The code may also be expressed mathematically, by its own reversed order version as follows:

$$C=[\exp \{j(\phi_1+\phi_2+\phi_3 \ldots +\phi_n)\}], \ldots [\exp \{j(\phi_1+\phi_2)\}], [\exp \{j(\phi_1)\}].$$

Complementary codes are defined by the property that the sum of their aperiodic autocorrelation functions is zero everywhere except at the zero shift. These codes have complementary autocorrelation functions in pairs and sets, and also have good crosscorrelation functions. The CCK codes of QPSK, with four discrete phases (0°, 90°, 180°, 270°), are chosen as a modulation method to support the higher data rates of IEEE 802.11b wireless local area networks (wireless LANs), since it easily provides a path for interoperability with existing systems by maintaining the same bandwidth as the 1 Mbps and 2 Mbps data rates operating in the 2.4 GHz Industrial, Scientific and Medical (ISM) band.

The CCK method uses eight complex chips in each spreading codeword. Each chip includes one of four phases (QPSK), and a set of 256 near-orthogonal 8-Chip complementary codes are selected for CCK of IEEE 802.11b, wherein each code has been called as a codeword, sequence or symbol interchangeably.

The QPSK Complementary codes, denoted by C, for CCK can be constructed from the following formula in the format of IEEE 802.11b:

$$c = \{e^{j(\varphi_1+\varphi_2+\varphi_3+\varphi_4)}, e^{j(\varphi_1+\varphi_3+\varphi_4)}, e^{j(\varphi_1+\varphi_2+\varphi_4)}, \quad (1)$$
$$-e^{j(\varphi_1+\varphi_4)}, e^{j(\varphi_1+\varphi_2+\varphi_3)}, e^{j(\varphi_1+\varphi_3)}, -e^{j(\varphi_1+\varphi_2)}, e^{j\varphi_1}\}$$

where, $\phi_1$, $\phi_2$, $\phi_3$, and $\phi_4$ are from the four phases of QPSK.

The CCK codes may be decoded by many methods: first, there is an optimal maximum likelihood method that needs a bank of 256 correlators in the receiver. However, this optimal method may be considered too complex for implementation. In order to solve this problem, there are many sub-optimum decoding methods that are less complex to implement.

Intersil (registered trademark, formerly Harris Corporation) provides under its trademark "PRISM" a chip set for related art DSSS (Direct Sequence Spread Spectrum) wireless transceivers complying with the IEEE 802.11 standard. The nomenclature HFA 3861A designates the baseband processor of the PRISM chip set.

The baseband processor HFA 3861A provides for differential binary phase shift keying (DBPSK) and differential Quadrature Phase Shift Keying (DQPSK) modulation schemes with data scrambling capability along with complimentary code keying (CCK) to provide the data rates of 5.5 and 11 Mbps.

The HFA3861A, implements the CCK codewords to achieve Ethernet data rates over wireless links, and provides robust packet error rate performance in multipath environments through the use of a RAKE Receiver.

FIG. 2a, FIG. 2b, FIG. 3a and FIG. 3b, show related art block diagrams of the data transmitting and receiving functionality of the IEEE 802.11b Wireless LAN operation with CCK modulator scheme.

Texas Instruments provides the TMS320C6416 DSP, (registered trademark of Texas Instruments) Digital Signal Processing (DSP) hardware platform to implement related art IEEE 802.11b WLAN standard in software.

It is to be noted that the IEEE 802.11b standard is limited to the data rates of 5.5 and 11 Mbps, and has no higher datarate options for encoding with CCK.

IEEE 802.11b specifies CCK modulation as standard, but other traditional encoders and decoders of modulation and coding schemes use specific modulation methods, which need modifications to the already standardized IEEE 802.11b Physical Layer (PHY) and Wireless LAN Medium Access Control (MAC) are not mandated because of the incompatibility.

It is also highly desirable to utilize SDR (Software Defined Radio) and SoC (System-on-Chip) technologies, which accommodate large scale memory and processor requirements needed to implement the ever-increasing demand for higher and higher datarates for wireless data transmission.

IEEE Standard 802.11 Wireless LAN Medium Access Control (MAC) and Physical Layer (PHY) specifications) is a protocol standard for wireless LAN communication. Its physical layer in the transmitter is responsible for encoding and modulating a packet into baseband signals for a stream of digitized information bits in the physical layer. In particular, IEEE 802.11b high datarate standard implements DS-Spread Spectrum technique using the standard form of CCK encoding scheme to achieve 5.5 and 11 Mbps datarates in Wireless LANs. The CCK encoding scheme requires that digital data be encoded by a complementary code belonging to a set of 256 codes. The digital data comprising eight bits (8-bits) of information is encoded on a 8-Chip CCK codeword and is transmitted at any given time, which results in 11 Mbps of maximum datarate.

SUMMARY OF THE INVENTION

One of the limitations of today's IEEE 802.11b networks with CCK modulation is the low datarates of only 5.5 and 11 Mbps possible, and higher datarates are not feasible. It is desirable to invent a CCK based new technology for IEEE 802.1b that provides, as in the present invention of OCDM-CCK, the capability of a wide choice of higher datarates such as 16.5 Mbps, 22 Mbps, 27.5 Mbps, 24.75 Mbps, 33 Mbps, 38.5 Mbps, 44 Mbps, 49.5 Mbps, 55 Mbps, 60.5 Mbps, 66 Mbps, 71.5 Mbps, 77 Mbps, 82.5 Mbps, 88 Mbps and 176 Mbps. The present invention employs Orthogonal Code Division Multiplexing (OCDM) combined with CCK signals, which we call OCDM-CCK. When integrated with CCK, the OCDM method needs only a single carrier frequency channel of IEEE 802.11b to deliver transmission rates in multiples of 5.5 Mbps such as but not limited to 33, 88 and 176 Mbps without the expense of increased bandwidth and thus is superior to the Orthogonal Frequency Division Multiplexing (OFDM) defined by the IEEE 802.11a standard, which needs higher bandwidth to increase datarate. It is also the object of some aspects of the present invention to provide improved devices and methods for high-speed wireless data communications, particularly to provide devices capable of reaching data rates above 11 Mbps while maintaining backward-compatibility with the IEEE 802.11b standard.

The invention is a method and apparatus, which discloses a scheme for encoding, modulation, demodulation and decoding of data for digital transmission and reception. More precisely, this invention is for the usage of Orthogonal Code Division Multiplexing (OCDM) and parallel channel encoding using Complementary Coded Keying (CCK). The new method, which we call OCDM-CCK, uses near-orthogonal subsets of complementary codes for encoding, in a plurality of baseband channel paths. The CCK codewords so generated in the parallel oaths are summed, and simultaneously transmitted on a common carrier frequency. On the receiver side, crosscorrelation detection for decoding in a plurality of parallel baseband DSP channels is utilized, which results in recovering the data in segmented format. The segments of data in parallel paths are then converted to serial data in a parallel-to serial converter. The method results in feasibility of very high datarates, because multiple CCK codewords carrying segments of data are transmitted simultaneously in OCDM fashion. On the transmitter side, the method encodes segmented digital data from a serial-to-parallel converter on near-orthogonal distinct CCK codewords in parallel baseband channel paths. The codewords are all transmitted on the same frequency and channel bandwidth in DSSS (Direct Sequence Spread Spectrum) fashion simultaneously. On reception, the digital data segments are individually detected by crosscorrelation in parallel channel paths, CCK decoded and reverted back to serial data in a parallel-to-serial converter.

In the present invention, since OCDM uses multiple symbols encoded in orthogonal codes to increase data rate and is not used for multiple access, it does not require any modifications to the IEEE 802.11b Medium Access Control (MAC) and physical layer (PHY) specifications or the frame format.

Since the standard already defines the multiple access technique (CSMA/CA), no changes to the IEEE 802.11b standard would be required to use OCDM-CCK.

Although the present invention will be described with respect to wireless communication and, specifically the IEEE Standard 802.11b, the principles also apply to other transmission and reception schemes, which involve data signal modulation and demodulation, encoding and decoding using so-called orthogonal or near-orthogonal codes in spread spectrum for enhanced datarates.

In OCDM-CCK, an encoder/modulator (20) encodes six-bits (6-bits) of information on each of four distinct CCK codes in parallel paths simultaneously at baseband frequency. The CCK codewords are then combined in OCDM (orthogonal code division multiplex) fashion to result in 33 Mbps of datarate. Since four codewords are simultaneously thus transmitted in the 2.4 GHz band using the existing 802.11b DSSS channel structure scheme instead of only one codeword as in traditional IEEE 802.11b, the total datarate in our invention results in a higher datarate of 33 Mbps. On reception at the OCDM-CCK receiver, the four CCK codewords are each decoded in parallel code division multiplex crosscorrelation detection channel paths individually, and parallel-to-serial converted to recover the data in original serial format for subsequent use. Each of the four encoding/decoding OCDM paths or channel paths uses a distinct subset of 16 codewords. Thus, each encoder has to pick one in sixteen complementary codes, and the decoder has to distinguish one out of sixteen codes by correlation. Thus, the OCDM-CCK digital signal processing (DSP) is more robust and less complex compared to traditional IEEE 802.11b CCK, where the encoder and decoder has to decide amongst 64 codes.

According to another embodiment of our invention, the Encoder/Modulator (37) uses 16 channel paths of OCDM with 4 codewords and 4-bits of information per code, which results in 88 Mbps. Similarly, by a combination of the number of correlator channel paths and the number of information bits mapped per codeword very high datarates in multiples of 5.5 Mbps including 176 Mbps are made possible in our invention.

According to the embodiment of the invention for the 33 Mbps case suitable for IEEE 802.11b backward compatibility, a group of 4 subsets with each having 16 complementary codes is used for encoding 6-bits of information per codeword.

According to the embodiment of the invention for the 88 Mbps case, a group of 16 subsets with each having 4 complementary codes is used for encoding 4-bits of information per codeword.

Accordingly, in exemplary aspects of the present invention there is provided an encoding system and method, including encoding a stream of M*n-bit serial digital data in 'M' orthogonal and near-orthogonal OCDM channels; and allocating 'n' bits per channel and which are mapped using Complementary Coded Keying (CCK) and transmitted simultaneously on the same carrier frequency and spread spectral bandwidth, whereby increased datarates of 33 Mbps, 88 Mbps, 176 Mbps and integer multiples of 5.5 Mbps are achieved for systems including IEEE 802.11b WLAN (Wireless Local Area Network) and wireless communication networks supporting real time Direct Sequence Spread Spectrum (DSSS). Those skilled in the art will appreciate that the embodiments and alternatives described above are non-limiting examples only, and that certain modifications can be made without departing from the spirit and scope thereof.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments, advantages and objectives defined in the included claims of the present invention will become more fully evident from the description given below, and the present invention is illustrated by way of example, and not by way of limitation, in the figures of the accompanying drawings and in wherein like reference numerals refer to similar elements, in which:

FIG. 4a, FIG. 4b, FIG. 4c and FIG. 4d, is the exemplary structure details of the OCDM-CCK Modulators 'A' (21), 'B' (22), 'C' (23) and 'D' (24) depicted in FIG. 4, which are all in accordance with the principles of the present invention;

FIG. 4e, FIG. 4f, FIG. 4g and FIG. 4h, disclose the specific generator algorithms (41, 42, 43, 44) of Codelist 'A' (33), Codelist 'B' (34), Codelist 'C' (35), and Codelist 'D' (36), respectively for look-up of the 33 Mbps case, and are obtained from the generic E-CCK Codelist generator algorithm of FIG. 9;

FIG. 6a discloses the Codelist generator algorithm for 88 Mbps, and other datarates in multiples of 5.5 Mbps;

FIG. 8a is the related art phase parameter 11 Mbps encoding scheme;

FIG. 8b is the DQPSK modulation scheme of OCDM-CCK for CCK Phase Parameters;

FIG. 8c is the phase parameter encoding scheme of OCDM-CCK for 33 Mbps;

FIG. 9 is the Generic E-CCK Code list generator algorithm for generating the four specific Codelists (33, 34, 35, 36) required for the 33 Mbps case for 33 Mbps; and FIG. 10 is a performance parameter comparison table for the OCDM-CCK with the traditional IEEE 802.11b of 11 Mbps proving superiority of the present invention in having the capability to extend datarates beyond to 33, 88, and 176 Mbps.

DETAILED DESCRIPTION OF THE INVENTION

Figure 1:
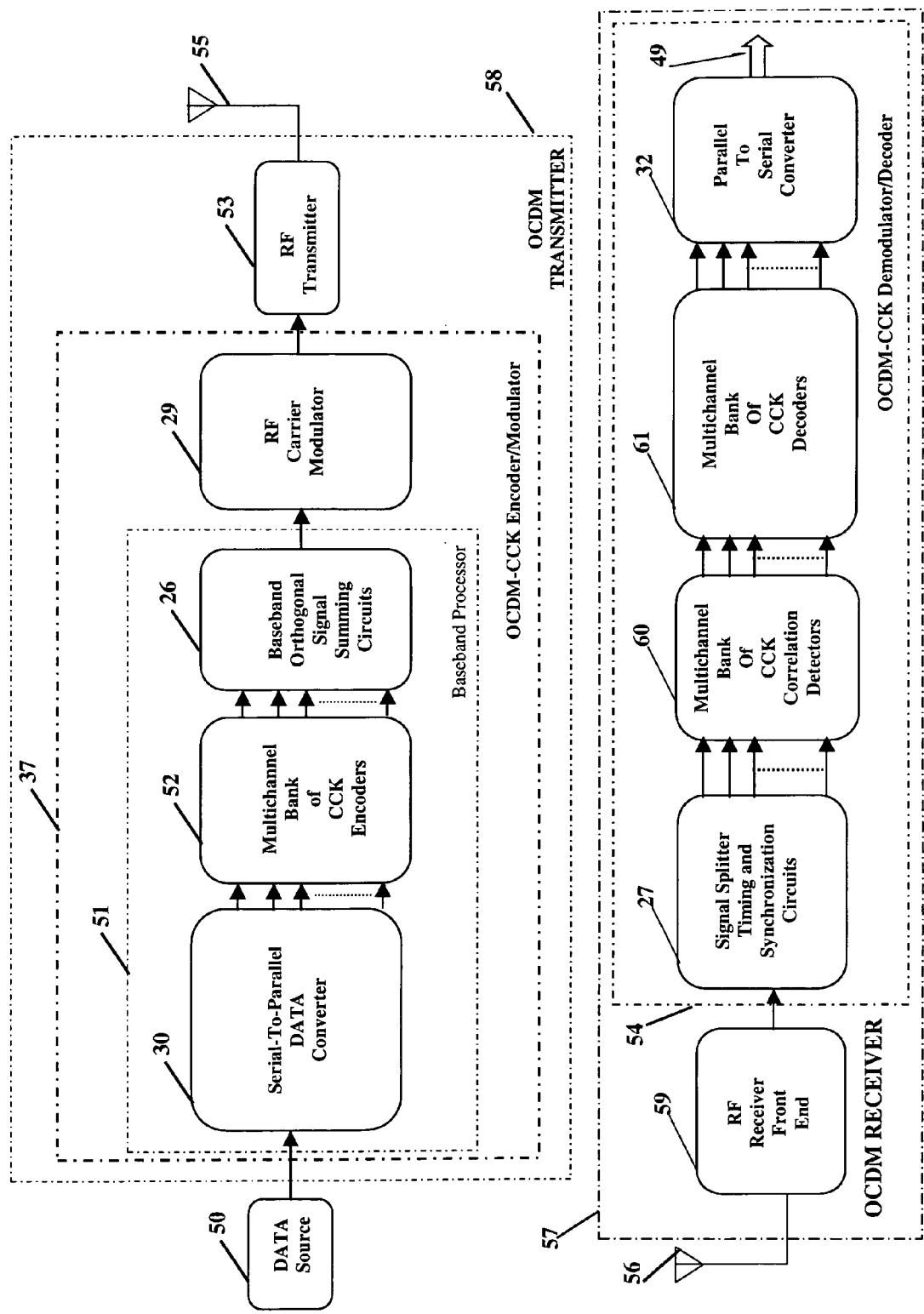
FIG. 1, is the transmitter (58) and receiver (57) portions of a transceiver arranged in accord with the principles of the present invention for OCDM-CCK method of operation, wherein the signal transmitted from the transmitter using an antenna (55) is received by a receiving antenna (56) of a receiver (57)
Figure 2A:
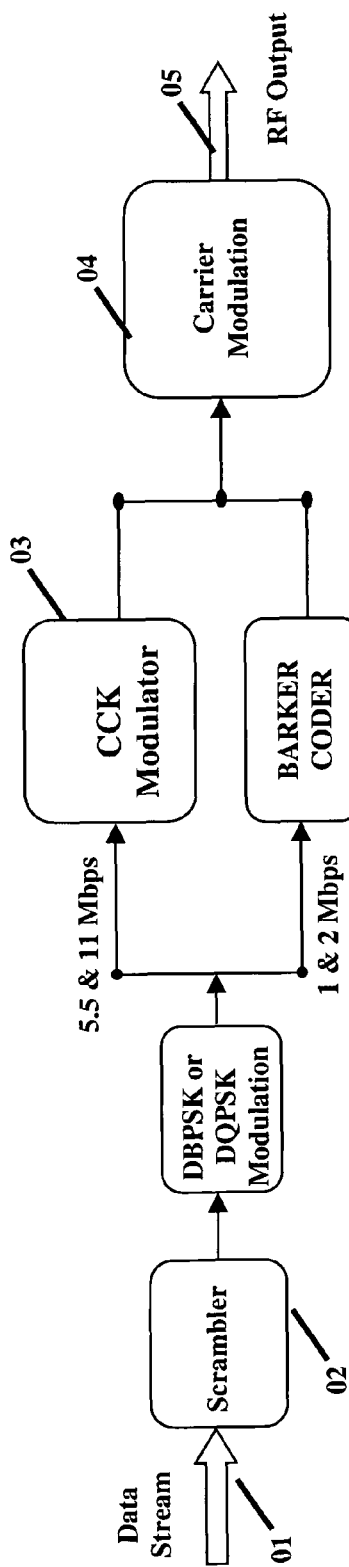
FIG. 2a is a related art block diagram of the data transmission functionality of current IEEE 802.11b standard, wherein data encoding for CCK modulations is limited to 5.5 & 11 Mbps in datarate, which is unsuitable for higher datarates exceeding 11 Mbps. The data transmission functionality of IEEE 802.11b in related art, uses a Scrambler (02) to scramble incoming digital data streams (01), and Barker Coder (13) for the datarates of 1 & 2 Mbps, and CCK Modulator (03) for 5.5 & 11 Mbps datarates, which are modulated for Carrier Modulation (04) resulting in RF output (05)
Figure 2B:
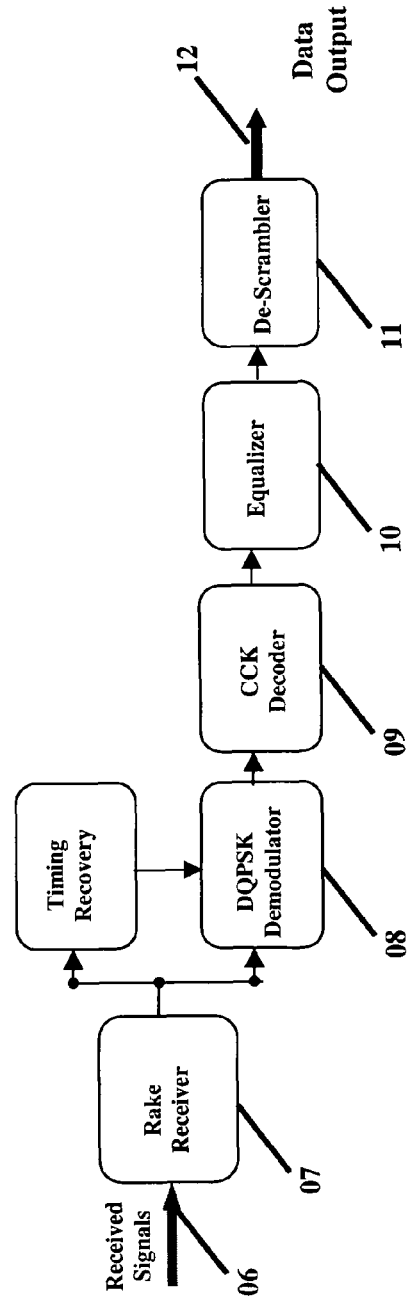
FIG. 2b is a related art block diagram of the data receiving functionality, of current IEEE 802.11b standard. The related art uses a Rake Receiver (07) for the Received Signals (06), for mitigating multipath effects. Furthermore, the related art signal processing employs a DQPSK demodulator (08), CCK Decoder (09), Equalizer (10), De-Scrambler (11) to result in Data Output (12), which is limited to decoding data not exceeding 11 Mbps in datarate and thus is incompatible for higher datarates.
Figure 3A:
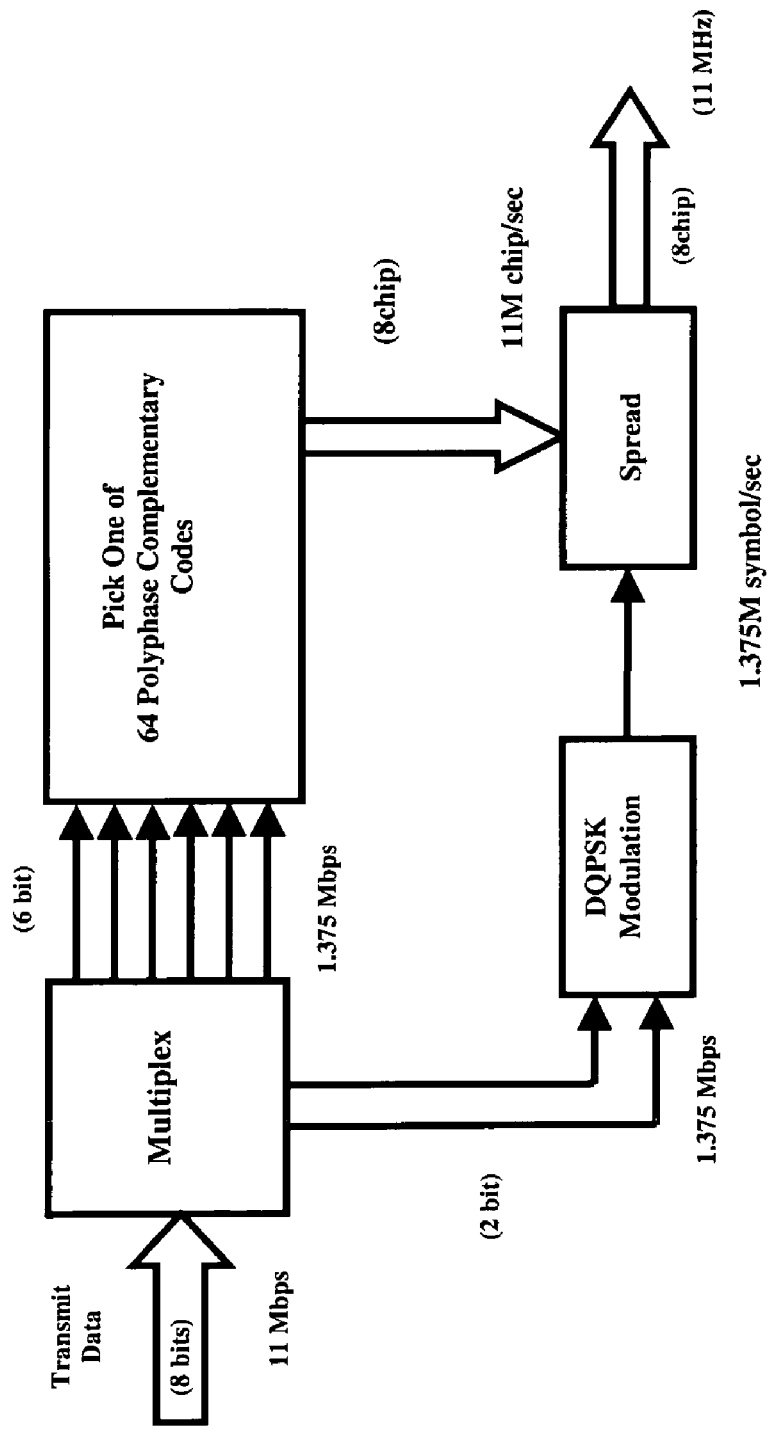
FIG. 3a is a block diagram of the related art CCK modulator for the 11 Mbps datarate and can not encode datarates higher than 11 Mbps, which uses polyphase complementary codewords for spread spectrum transmission.
Figure 3B:
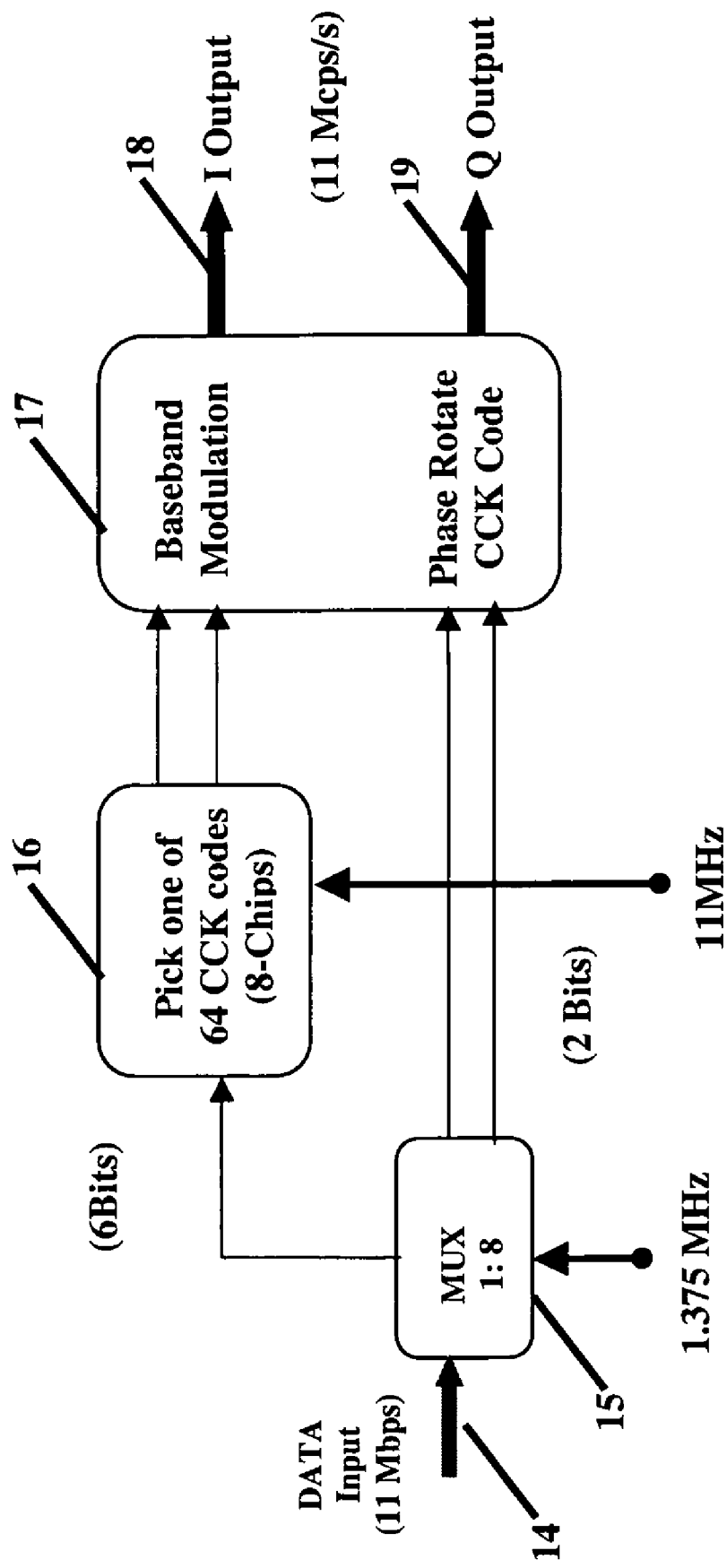
FIG. 3b is a related art block diagram of CCK encoder/modulator in another form for data encoding in IEEE 802.11b, which is incapable of encoding datarates higher than 11 Mbps. In the conventional architecture of related art, input data (14) limited to 11 Mbps is multiplexed in a 1:8 MUX (15) and is CCK encoded to output in I & Q channels (18, 19). The output consists of a single CCK code picked in the DSP block (16) out of sixty-four CCK codes for transmitting only 8-bits of data.

Before describing in detail the method and apparatus in accordance with the present invention, it should be observed that the present invention resides primarily in a novel functional combination of commercially available communication and signal processing circuits, components including IC chips, and not in the particular detailed configurations thereof. Accordingly, the structure, control and arrangement of these conventional circuits and components have been illustrated in the drawings by readily understandable block diagrams, which show only those specific details that are pertinent to the present invention so as not to obscure the disclosure with structural details, which will be readily apparent to those skilled in the art with the additional benefit of the description herein. Thus, the block diagram illustrations of the Drawings and Figures do not necessarily represent the mechanical structural arrangement of the exemplary system, but are primarily intended to illustrate the major structural components of the system in a convenient functional format, whereby the present invention may be more readily understood.

Referring now to FIGS. 4 to 7 and FIG. 1, the multichannel bank of CCK Encoders, Modulators, Demodulators, CCK Correlation Detectors, Decoders, Serial-to-Parallel and Parallel-to-Serial data converter interfaces and associated circuits of the present invention are diagrammatically illustrated in exemplary fashion as comprising an Encoder/Modulator block (20 and 37) for embedding in a wireless transmitter channel, and a Demodulator/Decoder block (31 and 38) for embedding in a receiver channel. As a non-limiting example, the embeddings required for OCDM-CCK operation of the present invention could be implemented in software for the signal processor sections of the following commercially available IC chip devices: Fujitsu MB87M3550, SDR SoC LSI of Fujitsu Microelectronics America inc., 1250 E. Arques Ave. Sunnyvale, Calif. 94088-3470; the TMS320C6416 DSP chip based hardware platform of Texas Instruments, POST OFFICE BOX 1443, HOUSTON, Tex. 77251-1443; the baseband processor HFA3860B of Intersil, 1001 Murphy Ranch Road, Milpitas, Calif. 95035.

The present invention is directed to a digital wireless communications system comprising data encoding, modulation and decoding schemes that are capable of higher datarates, in excess of 11 Mbps for CCK technique.

In the present invention, the serial-to-parallel converter section (30) is a data shift circuit for shifting the serial input data according to an input clock to store M*n bits of serial input data, and output that in blocks of n-bit segments into M number of parallel channels in synchronism for further processing.

The system of the invention will be described herein for the case of a digital data stream of the IEEE 802.11b standard conditioned for encoding with CCK.

The IEEE 802.11b digital data packet payload modulation with CCK is accomplished with QPSK complementary code sequences of eight complex chips, which are reputed for unique mathematical properties that facilitate distinguishing between the codewords or symbols at the receiver even in the presence of substantial noise and multipath interference. With a symbol rate of 1.375 Msymbols/s the CCK codewords occupies approximately the same spectrum as that of the DQPSK codewords of lower rate, which is 22 MHz. As a result, even at the higher data rates channels can occupy the ISM band.

In related Art, the IEEE 802.11b CCK code sequences for 11 Mbps are derived from the formula given in Equation (1) for C, where C is the codeword having the least significant bit (LSB) first and the most significant bit last. The phase parameters $\phi_1$, $\phi_2$, $\phi_3$, and $\phi_4$ are the four phases parameters derived from FIG. 8a and FIG. 8b, which are defined in the IEEE 802.11b std. The data bit stream is partitioned into 8-bits as (d8, d7, d6, d5, d4, d3, d2, d1), where d1 is the LSB and is first in time to occur. The 8-bits are used to encode the phase parameters $\phi_1$, $\phi_2$, $\phi_3$, and $\phi_4$ according to the scheme shown in FIG. 8a with the modulation scheme based on Differential QPSK (DQPSK) scheme of FIG. 8b, resulting in only 11 Mbps for the highest datarate possible.

In the present invention, FIG. 1 illustrates the generic structure of an OCDM-CCK transceiver system in block diagram form, wherein the Data Source (50) provides digital data for encoding and transmission. The RF and baseband processing functionality required for OCDM-CCK signal transmission is accomplished by the following blocks: Serial-To-Parallel Data Converter (30), Multichannel Bank of CCK Encoders (52), Baseband Orthogonal Signal Summing Circuits (26), RF Carrier Modulator (29) and RF Transmitter (53). An RF transmit Antenna (55) transmits the encoded and modulated signals from the RF Transmitter (53) to OCDM type wireless receivers, e.g., receiver (57) through a receiving Antenna (56).

Figure 4:
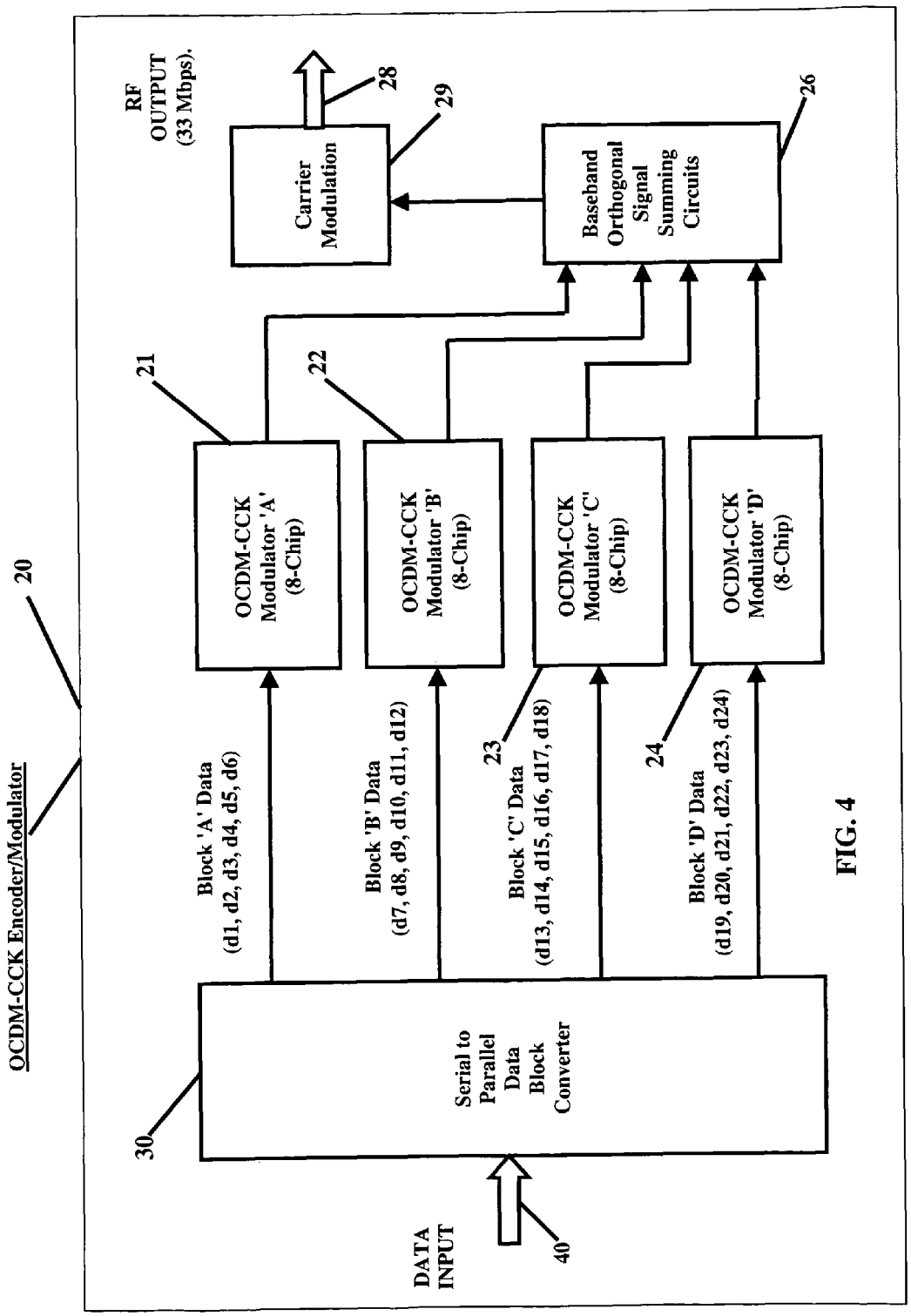
FIG. 4 is an exemplary embodiment of OCDM-CCK Encoder/Modulator (20) structure for the 33 Mbps case, in accordance with the present invention for IEEE 802.11b backward compatibility of the transmitter functionality.
Figure 4A:
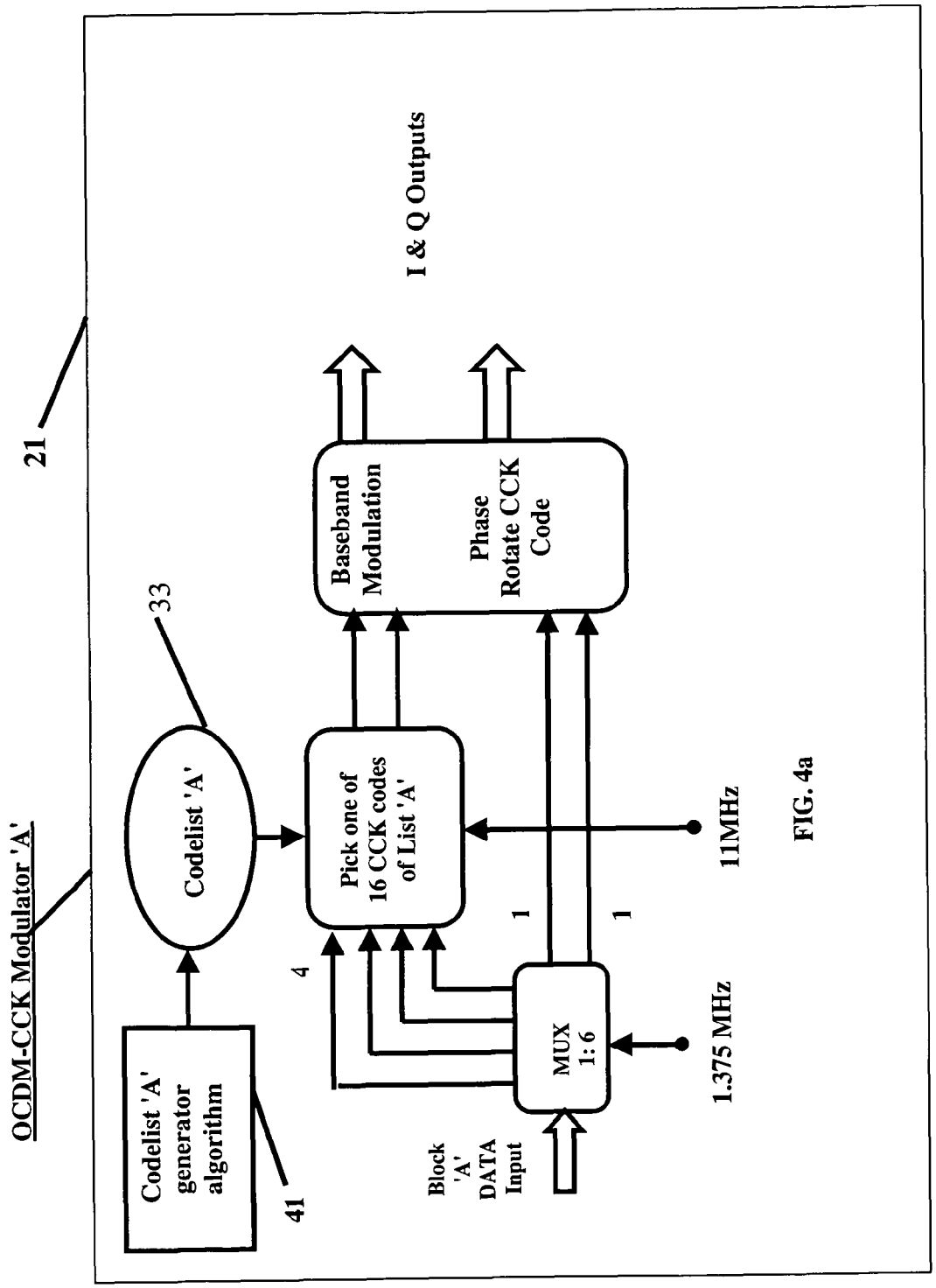
Figure 4:
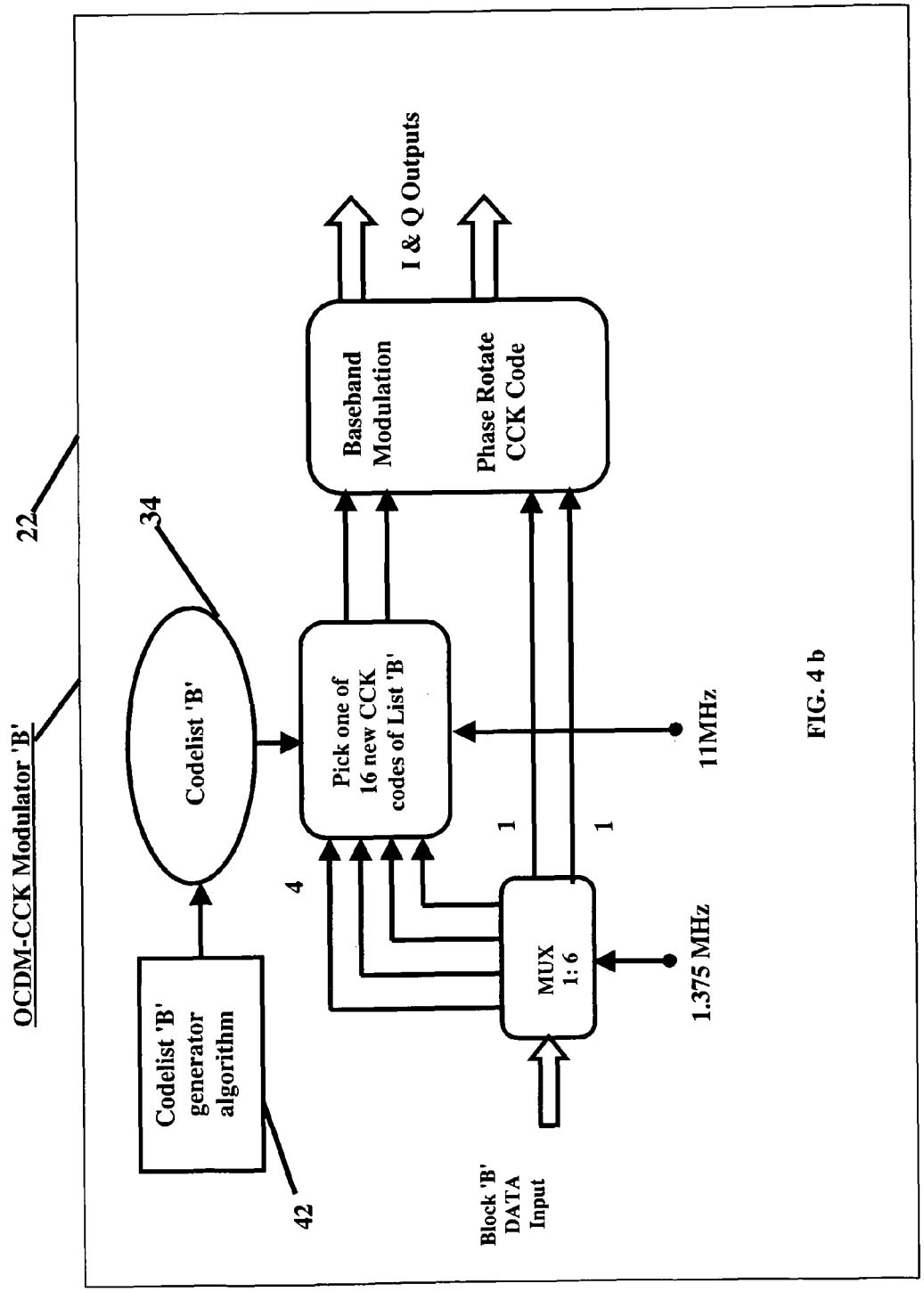
Figure 4C:
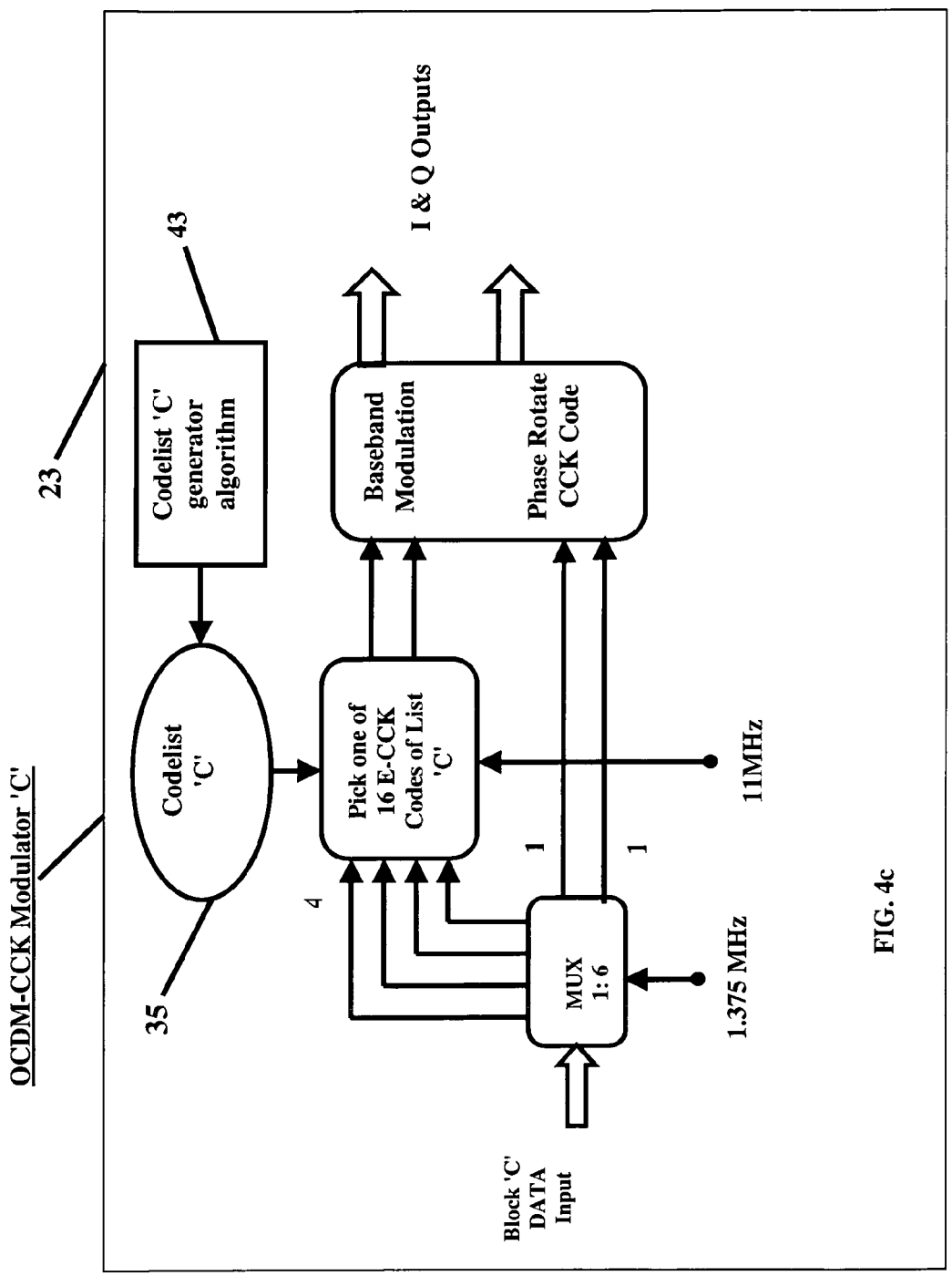
Figure 4D:
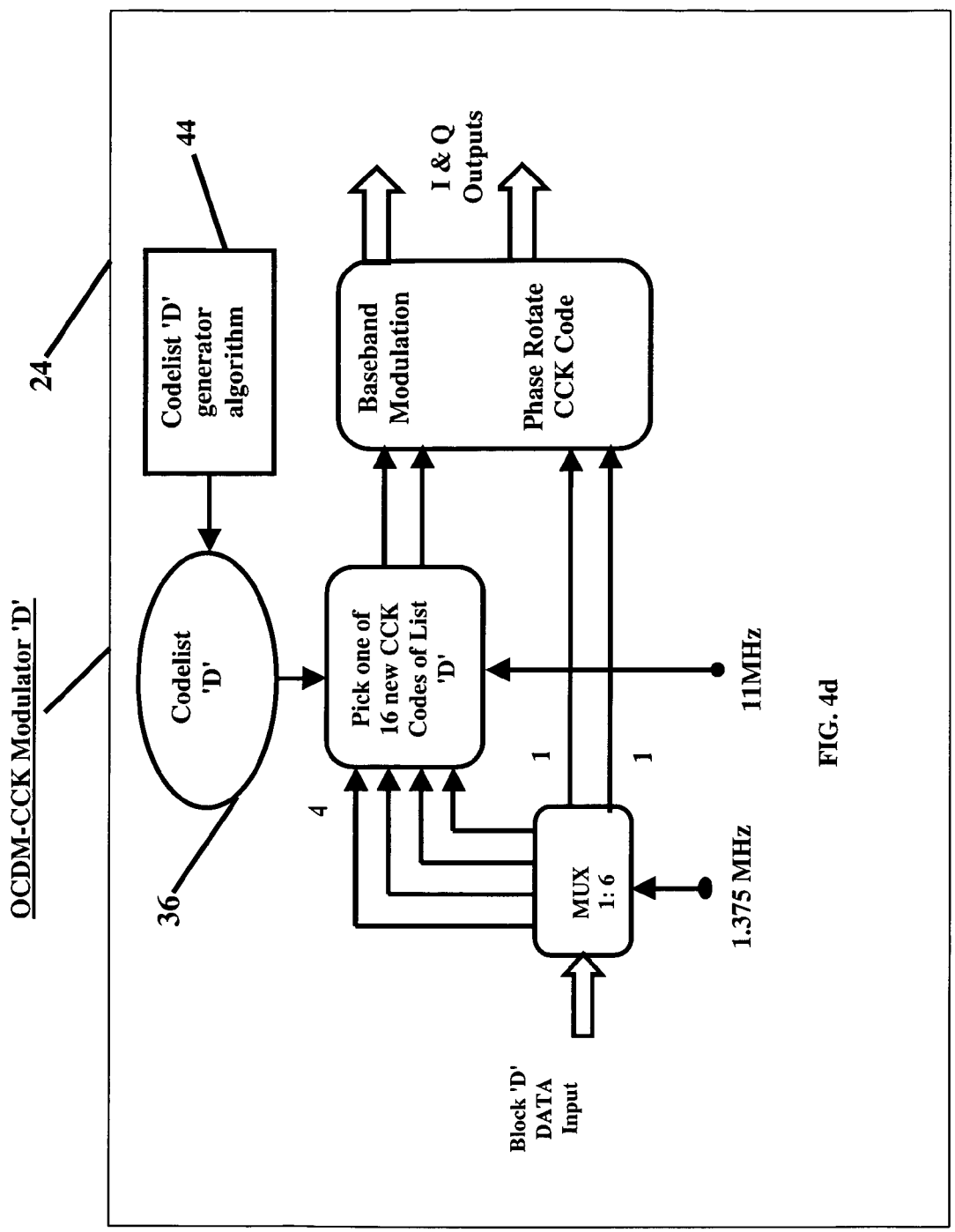

A particular embodiment of OCDM-CCK Encoder/Modulator (20) is illustrated in FIG. 4, for a datarate of 33 Mbps. Digital data (40) for CCK encoding is fed as input data to the Serial-to-Parallel Converter (30). From a segmented block of 6-bits, one codeword is generated per modulator in four modulators (21, 22, 23, 24), and four such 6-bit data blocks that are coded in four distinct near-orthogonal CCK codewords are generated in four modulators in parallel for a total of 24 bits of input digital data, and transmitted on common RF carrier modulation (29) simultaneously using the RF output (28). Since the four codewords are nearly orthogonal, they remain distinct, and separable on reception by crosscorrelation. The effective transmission datarate is 33 Mbps (6*4*11/8=33 Mbps), because a total of 24-bits of data are now transmitted in the 8-chip time interval of 8/11 microseconds for IEEE 802.11b standard specifications. In related art of traditional IEEE 802.11b, note that only 8-bits of data transmission is the maximum possible in the same time interval of (8/11) microseconds giving only 11 Mbps (8*11/8=11 Mbps).

The block diagrams shown as FIG. 4a, FIG. 4b, FIG. 4c and FIG. 4d, show exemplary structure details of the OCDM-CCK Modulators 'A' (21), 'B' (22), 'C' (23) and 'D' (24) respectively of FIG. 4, and are all depicted in accordance with the principles of the present invention. The FIG. 9, shows the generic E-CCK Code list generator algorithm for generating the four specific Codelists (33, 34, 35, 36) required for the 33 Mbps case. Note that the three parameters $\phi_1$, $\phi_2$, $\phi_3$ maps 6-bits of data in each of the four 6-bit blocks for the present case. The 6-bits are used to encode the phase parameters $\phi_1$, $\phi_2$, $\phi_3$, according to the encoding scheme given in FIG. 8c with the modulation scheme shown in FIG. 8b based on Differential QPSK (DQPSK). Thus, the phase parameters can map a 6-bit data block employed for a single CCK codeword in each of the four parallel channels of the present invention in the exemplary embodiment of FIG. 4.

Referring to FIG. 9, for the E-CCK Code list generator algorithm for 33 Mbps, the factor K is a phase constant that generates different codelists depending on the value selected. Four such distinct codelists of near-orthogonal codes are generated using four generator algorithms (41, 42, 43, 44) depicted in FIG. 4e, FIG. 4f, FIG. 4g and FIG. 4h respectively, wherein the different values of K are individually denoted by $K_1$, $K_2$, $K_3$, and $K_4$, which are chosen from the four following values: 0, $\pi/2$, $\pi$, $3\pi/2$. The four different algorithms each generate sixteen different near-orthogonal CCK codes in four different codelists (33, 34, 35, 36) employed for this case where 4 codes each carrying 6-bits of data may be transmitted to result in 33 Mbps datarate. Note that the total number of distinct CCK codes used being 64 in the present invention remains the same as in IEEE 802.11b CCK mode, but in four different orthogonal codelists.

FIG. 1 also includes the embodiment of a generic structure illustration for a OCDM-CCK receiver (57) in block diagram form, wherein a receiving Antenna (56) receives signals transmitted from OCDM type wireless transmitters, e.g., transmitter (58), and provides OCDM-CCK encoded and modulated RF signals to a OCDM-CCK Demodulator/Decoder (54) through a conventional RF Receiver Front-End (59), which includes a conventional channel matched filter and a conventional RAKE receiver (07). The following blocks accomplish OCDM-CCK signal reception and signal processing for demodulation, detection and decoding functionalities in accord with the present invention: RF Receiver Front End (59), Signal Splitter Timing and Synchronization Circuits (27), Multichannel Bank of CCK Correlation Detectors (60), Multichannel Bank of CCK Decoders (61). The Parallel-To-Serial Converter (32) restores the decoded parallel data segments to serial data output (49) for use by high-speed data recipients.

Figure 5:
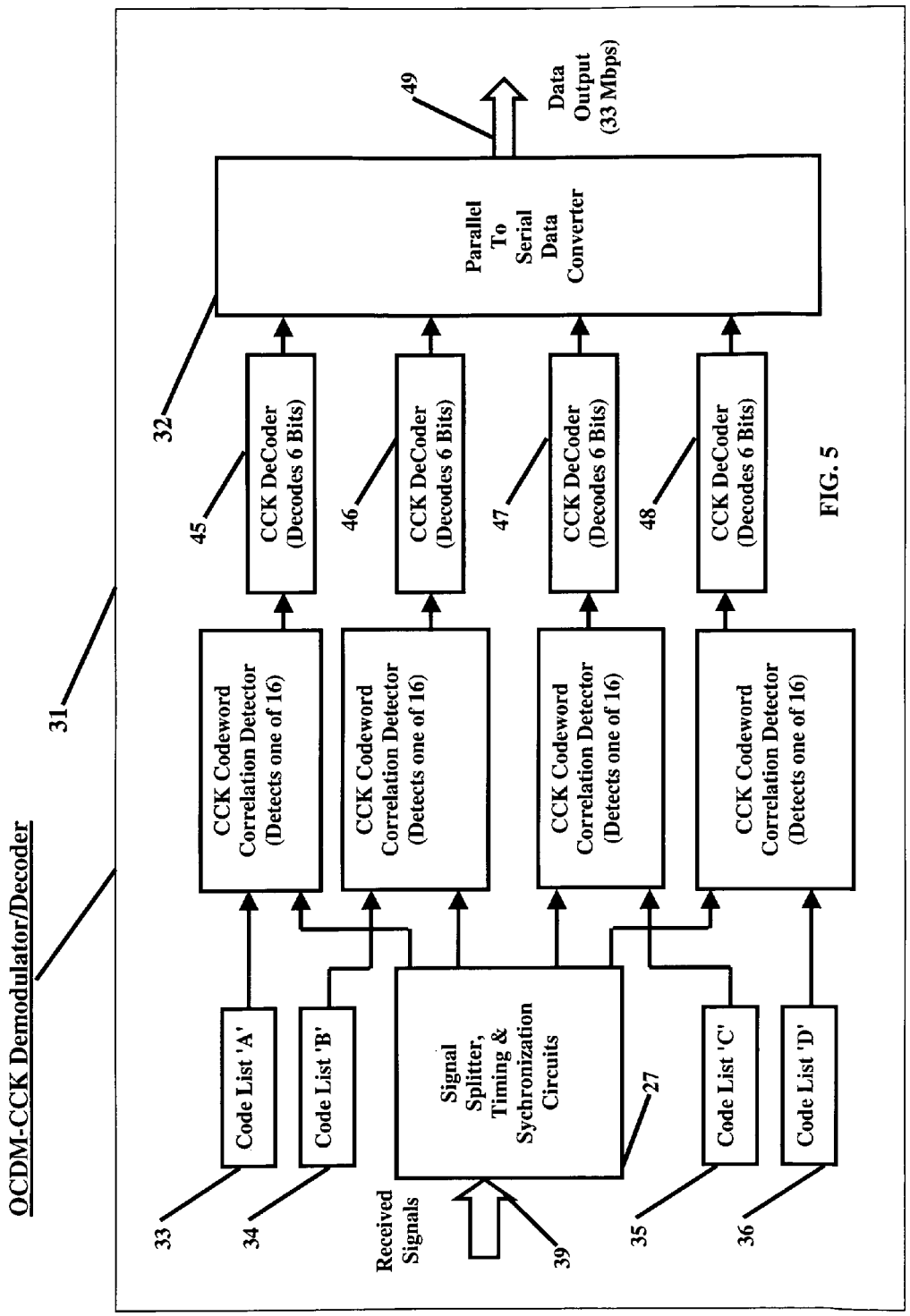
FIG. 5 is an exemplary embodiment of OCDM-CCK Demodulator/Decoder (31) structure for the 33 Mbps case in accordance with the present invention for IEEE 802.11b backward compatibility of the receiver functionality.

FIG. 5 illustrates the embodiment of the structure for OCDM-CCK Demodulator/Decoder (31) architecture for the 33 Mbps case. The OCDM-CCK modulated signals (39) received for demodulation are the coherently processed baseband received signals of the baseband processor as in standard IEEE 802.11b implementation that includes a channel matched filter and RAKE receiver (07) for multipath environments. The signal (39) is split into four parallel channels by a splitter (27) that includes system synchronization and timing. A bank of correlators ideally detect the exact codeword transmitted by autocorrelation with stored replicas of the 16 codewords in their respective channels, which are from Codelist 'A' (33), Codelist 'B' (34), Codelist 'C' (35) and Codelist 'D' (36) dedicated respectively to the four channels. A decision circuit in each channel, decides and decodes the code that was transmitted giving 4-bits of the data transmitted in the present case. The other 2 bits of the 6-bit data word are determined from the QPSK phase of the symbol represented by $\phi_1$ in each one of the four channels resulting in 6 Mbps of datarate per channel in the four CCK parallel channel Decoders (45, 46, 47, 48). The Decoders are used to find an index of a CCK codeword having the maximum correlation between the received signal represented by the received 8-chip codeword and all possible sixteen CCK codewords. This index is the decoded 6-bit data in each one of the four parallel channels. Furthermore, in the final stage of signal processing, the parallel data from the four Decoders is converted to serial in a Parallel-to-Serial converter (32) to result in the final data output (49) at 33 Mbps.

For transmission and reception, the mapping of the data bits to transmitted symbols, and vice-versa, is implemented in software by a look-up table comprising the binary code index corresponding to the CCK symbol for transmission by techniques customary in the art of SDR and SoC.

Figure 6:
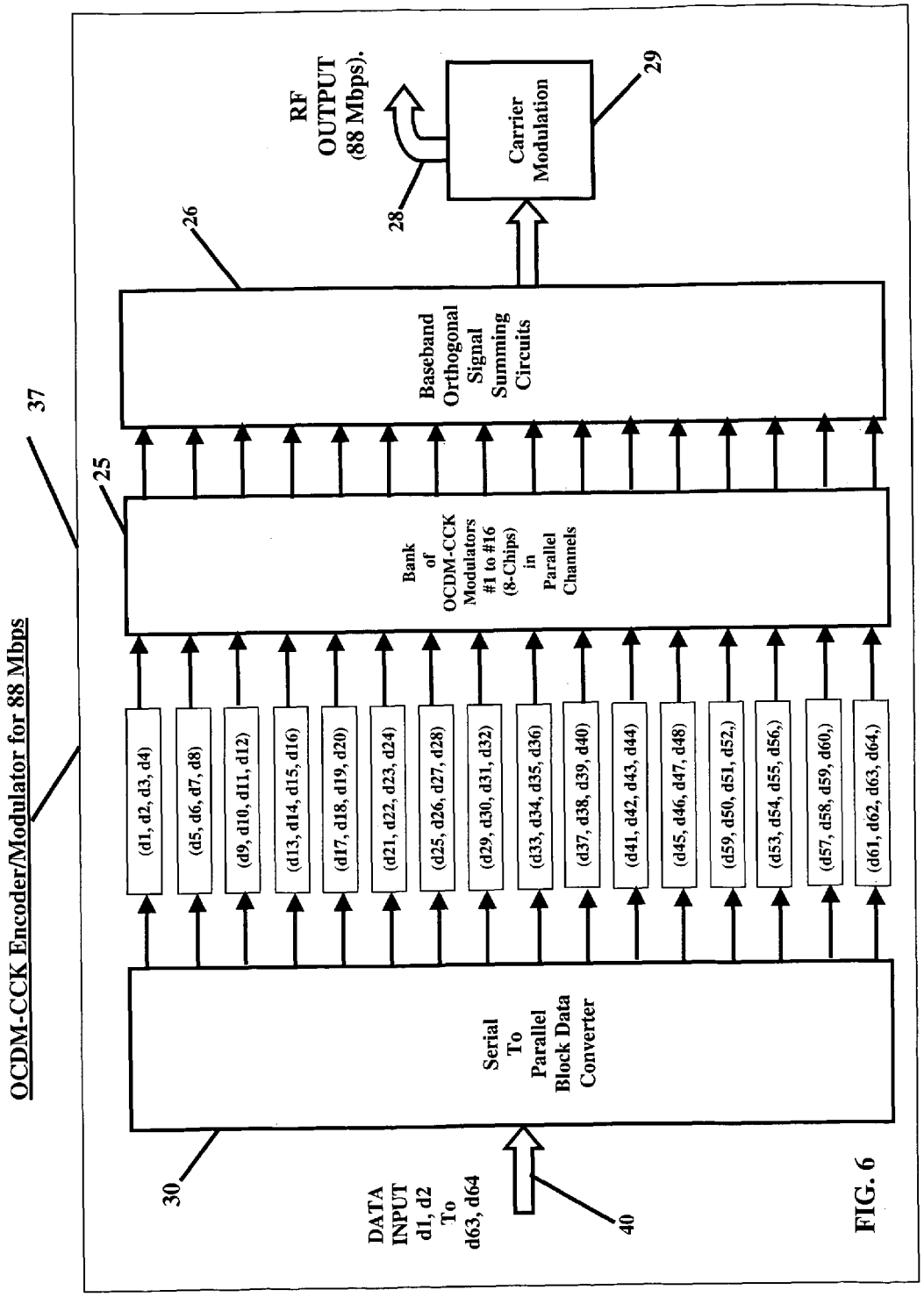
FIG. 6 is an exemplary embodiment of 88 Mbps OCDM-CCK Encoder/Modulator (37) structure for the present case, in accordance with our invention for IEEE 802.11b backward compatibility of the transmitter functionality.

In another exemplary embodiment of the present invention, FIG. 6 illustrates the OCDM-CCK Encoder/Modulator (37) for 88 Mbps with IEEE 802.11b protocol backward compatibility. The architecture (37) to realize a datarate of 88 Mbps includes a Serial-to-Parallel Block Data Converter (30) programmed to store a serial data stream input (40) of [d1, d2, . . . , d63, d64], and outputs sixteen parallel 4-bit data blocks. Digital data for OCDM-CCK encoding is fed as input data to the Serial-to-Parallel Converter (30) of FIG. 6, where it is segmented into 16 blocks of 4-bits each. In the modulation section (25), one codeword is picked out of four in each of the sixteen modulators in the OCDM-CCK Modulator Bank (25). For implementing 88 Mbps datarate, the sixteen blocks of 4-bit data are each coded individually into sixteen distinct near-orthogonal CCK codewords using sixteen separate codelists derived from the codelist generator algorithm of FIG. 6*a*. Each modulator in the Bank of Modulators (25), picks one out of four codes from its codelist corresponding to its assigned data block of 4-bits. The 16 near-orthogonal codes so picked are modulated in parallel baseband channels, and summed in the Baseband Orthogonal Signal Summing Circuits (26). In the next signal processing stage, the previously summed baseband signals are RF (Radio Frequency) modulated in Carrier Modulation (29) to generate the RF output (28) of FIG. 6 for simultaneous transmission of all the 16 codes in OCDM fashion comprising a total of 64 bits of digital data. Since the sixteen codewords so generated in the modulator Bank (25) are distinct and near-orthogonal in transmission, they are separable on reception in the OCDM-CCK Demodulator/Decoder (38) of FIG. 7 by DSP crosscorrelation with stored replicas of the 64 CCK codewords in the 16 separate codelists. Note that in this case the decision making circuitry has to decide on one-out-of-four {¼} codes for the decision making process, which results in robust detection with reduced complexity. For comparison, in the case of traditional IEEE 802.11b the detection is less robust and more complex because it is required to decide on one-out-of-sixtyfour {1/64} codes for the decision making process.

Figure 7:
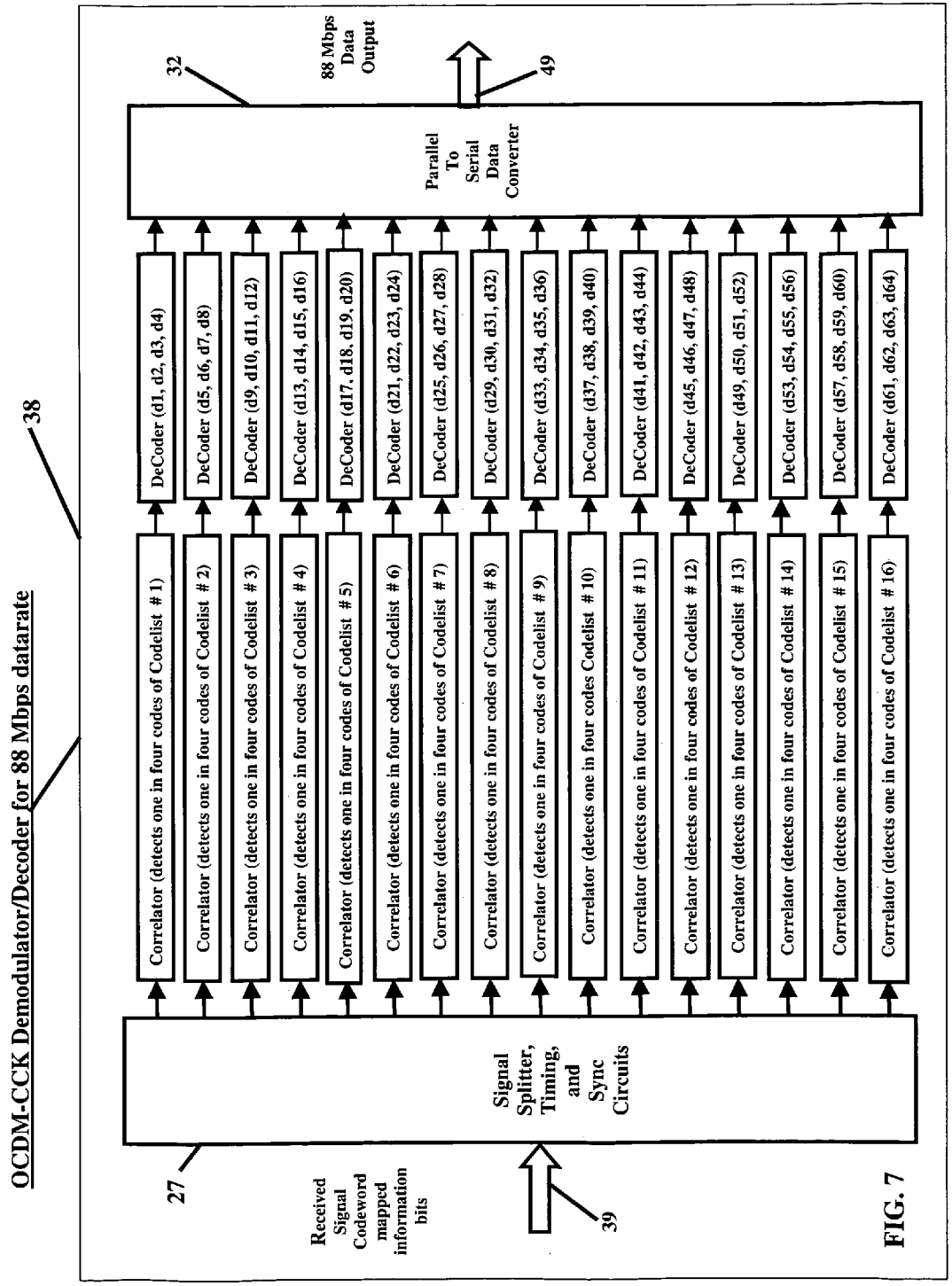
FIG. 7 is an exemplary embodiment for the structure of the OCDM-CCK Demodulator/Decoder (38) for the 88 Mbps case in accordance with the present invention for IEEE 802.11b backward compatibility of the receiver functionality.

The exemplary embodiment of the Demodulator/Decoder (38) of the present invention in FIG. 7, illustrates the architecture of the OCDM-CCK demodulation for the case of 88 Mbps datarate. The OCDM-CCK modulated received signal input (39) comprises the transmitted OCDM-CCK information bearing codewords received for demodulation, and are the coherently processed baseband received signals of the baseband processor as in standard IEEE 802.11b implementation that includes a channel matched filter and RAKE receiver (07) for multipath environments receiving the OCDM-CCK codeword information bearing signal. The signal (39) is split into 16 parallel channels by the splitter (27) of FIG. 7, which includes synchronization and timing. A bank of correlators ideally detect the exact codeword transmitted by autocorrelation with stored replicas of the 4 codewords in their respective channels from the corresponding codelists used for transmission, and the embedded 4-bit data is decoded from the code index of the codeword in 16 different DSP channel paths. The 16 DSP channel 4-bit parallel data is converted to serial format in the Parallel-to-Serial Data converter (32) to result in recovery of the original transmitted data in serial format at 88 Mbps at the output (49).

Finally, the table shown in FIG. 10 compares in tabular form the specifications and system performance parameters of IEEE 802.11b related art proving superiority of our present OCDM-CCK invention in having the capability to extend datarates beyond 11 Mbps to 33, 88, and 176 Mbps without any changes to the IEEE 802.11b standardized CCK chipping and symbol rates or the spreading bandwidth of 22 MHz.

Thus, the exemplary embodiments include a system and method for wireless communication and wireless local area networks (WLANs) of IEEE 802.11b using CCK for very high datarates of the order of 33 Mbps, 88 Mbps, 176 Mbps in multiples of 5.5 Mbps that are not available in today's networks, and is particularly directed to an improved transceiver that includes a new embedded Orthogonal Code Division Multiplex (OCDM) Complementary Coded Keying (CCK) system. In the exemplary system, a stream of digital data including M*n bits, denoted as M*n-bits, is coded in 'M' near-orthogonal OCDM channels with 'n' bits per channel and transmitted simultaneously using enhanced CCK (E-CCK) modulations on the same carrier frequency and spread spectral bandwidth. Parallel CCK coded OCDM channel paths of sequences are employed to enhance datarates dramatically. The transceiver apparatus includes a wireless communication system supporting real time Direct Sequence Spread Spectrum (DSSS) communications using a novel method for encoding digital data on complementary codes in parallel OCDM configuration, to increase datarates by several orders of magnitude, hitherto not envisaged in IEEE 802.11b standard. The exemplary method and apparatus invented for this technology can be referred to as OCDM-CCK. The OCDM-CCK encoding system for Wireless LAN includes multiple spreading codes in a set that map input digital data in segments of n-bits on different N-Chip near-orthogonal polyphase complementary codes derived from a specific algorithm. The codewords so selected for OCDM and called as Enhanced CCK (E-CCK) codes are each modulated in a plurality of distinct baseband channel paths using a common bandwidth, and transmitted on the same carrier frequency channel. At the receiver end, correlation detection and decoding results in individually demodulated and decoded blocks of data segments in parallel baseband channel paths, which are then converted to serial format in a Parallel-to-Serial converter to recover the encoded high datarate digital data. In implementing this method, the transceiver system picks complementary codes to pack maximized number of information bits into multiple near-orthogonal symbols resulting in maximized data rate for transmission. Transceiver examples for 88 Mbps and 33 Mbps using the above method with QPSK modulations for encoding data on 8-Chip four-phase CCK codewords, which do not require any modifications to the IEEE 802.11b Medium Access Control (MAC) and physical layer (PHY) specifications, are disclosed for WLAN backward compatibility. The OCDM-CCK method needs only a single carrier frequency channel of IEEE 802.11b to deliver transmission rates in multiples of 5.5 Mbps including 33, 88 and 176 Mbps without the expense of increased bandwidth and thus is superior to Orthogonal Frequency Division Multiplexing (OFDM), which can only increase datarate at the expense of increased bandwidth.

Those skilled in the art will appreciate that the embodiments and alternatives described above are non-limiting examples only, and that certain modifications can be made without departing from the spirit and scope thereof.

What we claim is:

1. An Orthogonal Code Division Multiplexing CCK (OCDM-CCK) wireless transceiver system, the system comprising:
   a RF (Radio Frequency) DSSS (Direct Sequence Spread Spectrum) transmission means for transmitting simultaneously a plurality of data carrying symbols, using a Complementary Code Keying (CCK) scheme, and means including:
   a serial-to-parallel data converter to convert a serial digital data input to a plurality of parallel data segments;
   an encoder to encode the said parallel data segments into a plurality of symbols in parallel baseband paths according to a Complementary Code Keying (CCK) scheme;
   a modulator to modulate the said data segments on distinct orthogonal and/or near-orthogonal CCK coded signals; and
   a summing circuit to sum the said CCK coded signals at baseband frequency to result in a composite signal; and
   a RF modulator to modulate the said composite signal on an RF carrier to transmit via a channel to a corresponding OCDM-CCK receiver.

2. The system of claim 1, further comprising: an RF receiving means to receive transmitted OCDM-CCK RF signals, including:
   a frequency converter, which down-converts the RF signal to baseband, and a baseband processor comprising:
   a signal power splitter, which splits the baseband signal into a plurality of parallel channel paths;
   a Demodulator/Decoder that comprises a plurality of parallel channels in a bank for correlation detection and decoding of the transmitted data;
   a processor to perform Digital Signal Processing (DSP) for each of the channel paths; comprising: means for cross-correlation detection in a correlation detector dedicated to the channel path;
   DSP for dedicating specific CCK codelists to each channel path;
   DSP for detection of the specific CCK symbol present in that channel path by correlation;
   DSP means for using stored CCK sequences of the said specific CCK codelist for correlation;
   DSP for demodulating and decoding the CCK sequence in each path to recover the data segment;
   DSP means for recovering the data signal segments in all the parallel paths using stored CCK look-up tables; and
   DSP means for converting the recovered parallel data to serial data signal output.

3. The system of claim 1, further comprising:
   a bank of 'M' parallel data modulators, which generate and transmit simultaneously, M number of orthogonal spreading codes, and each code encoding n-bits of data on a distinct N-Chip polyphase complementary code, wherein the parameters 'M', 'n' and 'N' are integers.

4. The system of claim 1, wherein the system is configured for the IEEE 802.11b protocol standard of transmission, and backward compatibility in IEEE 802.11b WLAN (Wireless Local Area Network).

5. The system of claim 1, including a encoder/modulator for OCDM-CCK comprising:
   a serial-to-parallel data converter for converting serial data input to four parallel blocks of 6-bits each;
   a bank of four parallel OCDM-CCK modulators; and each of the said modulators encoding a distinct 8-Chip CCK orthogonal spreading code to produce a baseband signal; and
   a baseband signal summing circuit, which adds the baseband signals to result in a composite signal for RF carrier modulation resulting in the OCDM-CCK signal RF output at 33 Mbps.

6. The system of claim 1, further including a baseband processor for Digital Signal Processing (DSP) in each modulator, and the DSP comprising:
   serial-to-parallel data multiplexing (MUX) that is clocked at the symbol rate of 1.375 MHz; and selects 4-bits of the MUX output to pick one of sixteen CCK complex codes of 8-chips from a designated codelist, which is generated in accordance with a designated CCK generator algorithm; and further selects the remaining 2-bits of the MUX output to phase rotate the picked 8-chip CCK code word in accordance with a designated CCK phase rotating scheme; and
   baseband modulation to modulate the CCK phase rotated codeword to produce a complementary coded signal at baseband having a length of 8-chips at 11 Mchips/s (Mega chips per second) and output the CCK modulated baseband signal as Inphase & Quadrature components (I & Q) to a Baseband Orthogonal Signal Summing Circuit.

7. The system of claim 1, including a demodulator/decoder for OCDM-CCK comprising:
   a signal power splitter with timing and synchronization circuits for splitting the OCDM-CCK received signals into four baseband channels paths in parallel; and connected to four CCK codeword correlation detectors in parallel, which are connected to four CCK decoders, wherein each decoder decodes a 6-bit data signal in each path; and
   a parallel-to-serial data converter, which restores the four parallel data signals to serial data output at 33 Mbps.

8. The system of claim 1, further configured in wireless transmission systems for compliance with IEEE 802.11a/b/g/n and/or IEEE WLAN standards, to result in a plurality of datarates not currently specified for CCK, including 8.25 Mbps, 16.5 Mbps, 22 Mbps, 27.5 Mbps, 24.75 Mbps, 33 Mbps, 38.5 Mbps, 44 Mbps, 49.5 Mbps, 55 Mbps, 60.5 Mbps, 66 Mbps, 71.5 Mbps, 77 Mbps, 82.5 Mbps, 88 Mbps, and 176 Mbps, and higher multiples of 5.5 Mbps.

9. The system of claim 1, further including an encoder/modulator for OCDM-CCK comprising:
    a serial-to-parallel data converter for converting serial data input to sixteen parallel blocks of 4-bits each;
    a bank of sixteen parallel OCDM-CCK modulators; and each of the said modulators encodes 4-bits of data on a distinct 8-Chip CCK orthogonal spreading code to produce a baseband signal; and
    a baseband signal summing circuit, which adds the said baseband signals to result in a composite signal for RF carrier modulation and results in the OCDM-CCK signal RF output at 88 Mbps.

10. The system of claim 1, further including:
    a RF receiving means to receive transmitted OCDM-CCK RF signals and including a demodulator/decoder comprising:
    a signal power splitter with timing and synchronization circuits for splitting the OCDM-CCK received signals into sixteen baseband channels paths in parallel; and connected to sixteen CCK codeword correlation detectors in parallel, which are connected to sixteen CCK decoders, wherein each decoder decodes a 4-bit data signal; and a parallel-to-serial data converter, which restores the parallel data signals to serial data output at 88 Mbps.

11. The system of claim 1, comprising a OCDM-CCK encoder/modulator comprising:
    a serial-to-parallel data converter for converting serial data input to sixty-four parallel blocks of 2-bits each;
    a bank of sixty-four parallel OCDM-CCK modulators; and each of the said modulators encodes 2-bits of data on a distinct 8-Chip CCK orthogonal spreading code to produce a baseband signal; and
    a baseband signal summing circuit, which adds the said baseband signals to result in a composite signal for RF carrier modulation and further results in the OCDM-CCK signal RF output at 176 Mbps.

12. The system of claim 1 further including a transceiver, which encodes 8-Chip orthogonal or near-orthogonal CCK codewords in a bank of four or a plurality of OCDM-CCK modulators in parallel for IEEE 802.11b WLAN backward compatibility and high datarate applications.

13. A computer program product, which configures/reconfigures a wireless transceiver for Orthogonal Code Division Multiplex (OCDM) data transmission using CCK codewords for OCDM-CCK, and further comprising:
    a computer program product embedded in a microprocessor usable medium having computer readable codes embodied in the medium that, when executed, causes microprocessors to execute OCDM-CCK data transmission/reception.

14. The system of claim 1, wherein the system is implemented in a Software Defined Radio (SDR).

15. The system of claim 1, implemented in a System-on-Chip (SoC) for a Large Scale Integrated (LSI) chip.

16. An Orthogonal Code Division Multiplexing CCK (OCDM-CCK) wireless transceiver transmitting method, the method including:
    Digital Signal Processing (DSP) for serial-to-parallel data conversion, to convert a stream of M*n-bit serial digital data stream into n-bit parallel data segments in 'M' parallel baseband channels, for integer values of 'M' and 'n';
    DSP for data encoding, to encode the said parallel data segments into a plurality of symbols simultaneously in parallel paths according to a Complementary Code Keying (CCK) scheme;
    DSP for CCK modulation, to modulate the said data segments on distinct orthogonal and/or near-orthogonal complementary coded signals;
    DSP for signal summing, to sum the said CCK coded signals at baseband frequency to result in a composite signal, and
    DSP for modulation to modulate the said composite signal on an RF carrier for transmission via a wireless communication channel.

* * * * *